United States Patent
Wang et al.

(10) Patent No.: US 9,164,668 B2
(45) Date of Patent: Oct. 20, 2015

(54) DEFINING OBJECT GROUPS IN 3D

(71) Applicant: Dassault Systèmes DELMIA Corp., Auburn Hills, MI (US)

(72) Inventors: Albert Wang, Rochester Hills, MI (US); Girish B. Shenoy, Rochester Hills, MI (US); Gaurav Jain, Rochester Hills, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 239 days.

(21) Appl. No.: 13/714,320

(22) Filed: Dec. 13, 2012

(65) Prior Publication Data

US 2014/0173477 A1    Jun. 19, 2014

(51) Int. Cl.
 G06F 3/0484 (2013.01)
 G06F 3/0482 (2013.01)
 G06F 3/0486 (2013.01)
 G05B 19/418 (2006.01)

(52) U.S. Cl.
 CPC .......... *G06F 3/04845* (2013.01); *G06F 3/0482* (2013.01); *G06F 3/0486* (2013.01); *G05B 19/41885* (2013.01)

(58) Field of Classification Search
 CPC ... G06F 9/4443; G06F 3/0481; G06F 3/0482; G06F 3/04842; G06F 3/0488; G06F 3/017; G06F 3/0484; G06F 17/24; G06F 3/048; G06F 3/0486; G06F 3/04815; G09G 5/14; H04N 5/44591; G06T 15/005; G06T 19/00; G06T 11/001; G06T 11/40; G06T 11/60
 See application file for complete search history.

(56) References Cited

U.S. PATENT DOCUMENTS

| | | | |
|---|---|---|---|
| 6,898,472 B2 | 5/2005 | Crampton et al. | |
| 7,539,630 B2 | 5/2009 | Crampton et al. | |
| 7,693,976 B2 | 4/2010 | Perry | |
| 8,757,485 B2 * | 6/2014 | Drees et al. | 235/385 |
| 2003/0149631 A1 | 8/2003 | Crampton et al. | |
| 2004/0177319 A1 * | 9/2004 | Horn | 715/501.1 |
| 2005/0177796 A1 * | 8/2005 | Takahashi | 715/769 |
| 2008/0195973 A1 * | 8/2008 | Shimkin | 715/817 |
| 2012/0092346 A1 * | 4/2012 | Ording et al. | 345/473 |
| 2012/0239513 A1 * | 9/2012 | Oliver et al. | 705/14.73 |
| 2013/0174070 A1 * | 7/2013 | Briand | 715/769 |

OTHER PUBLICATIONS

Title: Drag and Drop operation in a graphical user interface with highlight of target objects Inventor: Briand U.S. Appl. No. 61/581,477, filed Dec. 29, 2011.*
Beamon, B. "Supply Chain Design and Analysis: Models and Methods", International Journal of Production Economics, 55:3 pp. 281-294, 1998.

* cited by examiner

*Primary Examiner* — Boris Pesin
*Assistant Examiner* — Mandrita Brahmachari
(74) *Attorney, Agent, or Firm* — Hamilton, Brook, Smith & Reynolds, P.C.

(57) ABSTRACT

A computer-implemented method for defining a group of virtual objects representative of physical objects includes receiving a user input via an input device, wherein the user input relates to at least one virtual object. The method also includes using a processor to determine a purpose of the user input, modifying an object group with respect to the virtual object based on the purpose of the user input, and storing the relationship between the object group and the object in a memory area.

20 Claims, 9 Drawing Sheets

DEFINING OBJECT GROUPS IN 3D

BACKGROUND OF THE INVENTION

The embodiments described herein relate generally to managing virtual objects and, more particularly, to creating, modifying, and deleting groups of virtual objects that represent real-world objects.

Group management is traditionally managed with a table that displays information such as a list of group members, a group name, and elements that are available to add to the group. Moreover, some group management solutions also use images, whether two-dimensional (2D) or three-dimensional (3D) pictures, to illustrate the elements of a group. However, such traditional group management solutions generally include text displays that do not correlate similar elements with advanced technical and/or subjective naming. Moreover, known group management solutions require continuous back-and-forth eye motion from the user between a text display, such as a list of group members, and an associated 2D or 3D representation of the group, its members, and other available elements. This kind of continuous motion can cause fatigue to the user and/or allow the user to more easily make mistakes. In addition, known solutions require continuous back-and-forth motion of an input device, such as moving a mouse back and forth between a list of group members, and an associated 2D or 3D representation of the group, its members, and other available elements. Such motion results in decreased usability and can cause fatigue to the user and/or allow the user to more easily make mistakes.

SUMMARY OF THE INVENTION

In one aspect, a computer-implemented method is provided for defining a group of virtual objects representative of physical objects. The computer-implemented method includes receiving a user input via an input device, wherein the user input relates to at least one virtual object, and using a processor to determine a purpose of the user input. The method also includes modifying an object group with respect to the virtual object based on the purpose of the user input and storing the relationship between the object group and the virtual object in a memory area.

In another aspect, a computer device is provided for use in defining a group of virtual objects representative of physical objects. The computer includes an input device, a memory area, and a processor coupled to the input device and the memory area. The processor is configured to receive a user input via the input device, wherein the user input is related to at least one virtual object, and to determine a purpose of the user input. The processor is also configured to modify an object group with respect to the virtual object based on the purpose of the user input and to store the relationship between the object group and the virtual object in the memory area.

In another aspect, a computer system is provided for use in defining a group of virtual objects representative of physical objects. The computer system includes a client device configured to receive a user input related to at least one virtual object. The computer system also includes a server system coupled to the client device. The server system is configured to determine a purpose of the user input, modify an object group with respect to the virtual object based on the purpose of the user input, and store the relationship between the object group and the virtual object in a memory area.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Exemplary embodiments of computer systems, computer-implemented methods, and computer devices for use in defining and/or managing groups of virtual objects are described herein. The embodiments described herein facilitate increased productivity for users by enhancing the user's efficiency. For example, the user can create an object group with only a couple of inputs and without scanning a text list of existing groups, elements within the groups, and elements that have not been assigned to any groups. Moreover, the embodiments described herein facilitate decreased eye and/or muscle strain, as well as decreased fatigue, by eliminating the need for the user to continuously move back and forth between a textual representation of group membership and a graphical representation of real-world objects. Furthermore, the embodiments facilitate mobility for users by decreasing the amount of screen necessary to display group memberships and to manage group membership. This enables use of mobile devices such as smartphones and tablet computers.

As used herein, the term "virtual object" refers generally to a software-generated model of a real-world object. For example, a virtual object may be a three-dimensional model of a machine used in manufacturing. However, the term "virtual object" is not limited to only three-dimensional representations of real-world objects but may also refer to two-dimensional representations. Moreover, the real-world objects are not limited to only manufacturing machines but may instead refer to any suitable resource for use in a pre-defined process.

Figure 1:
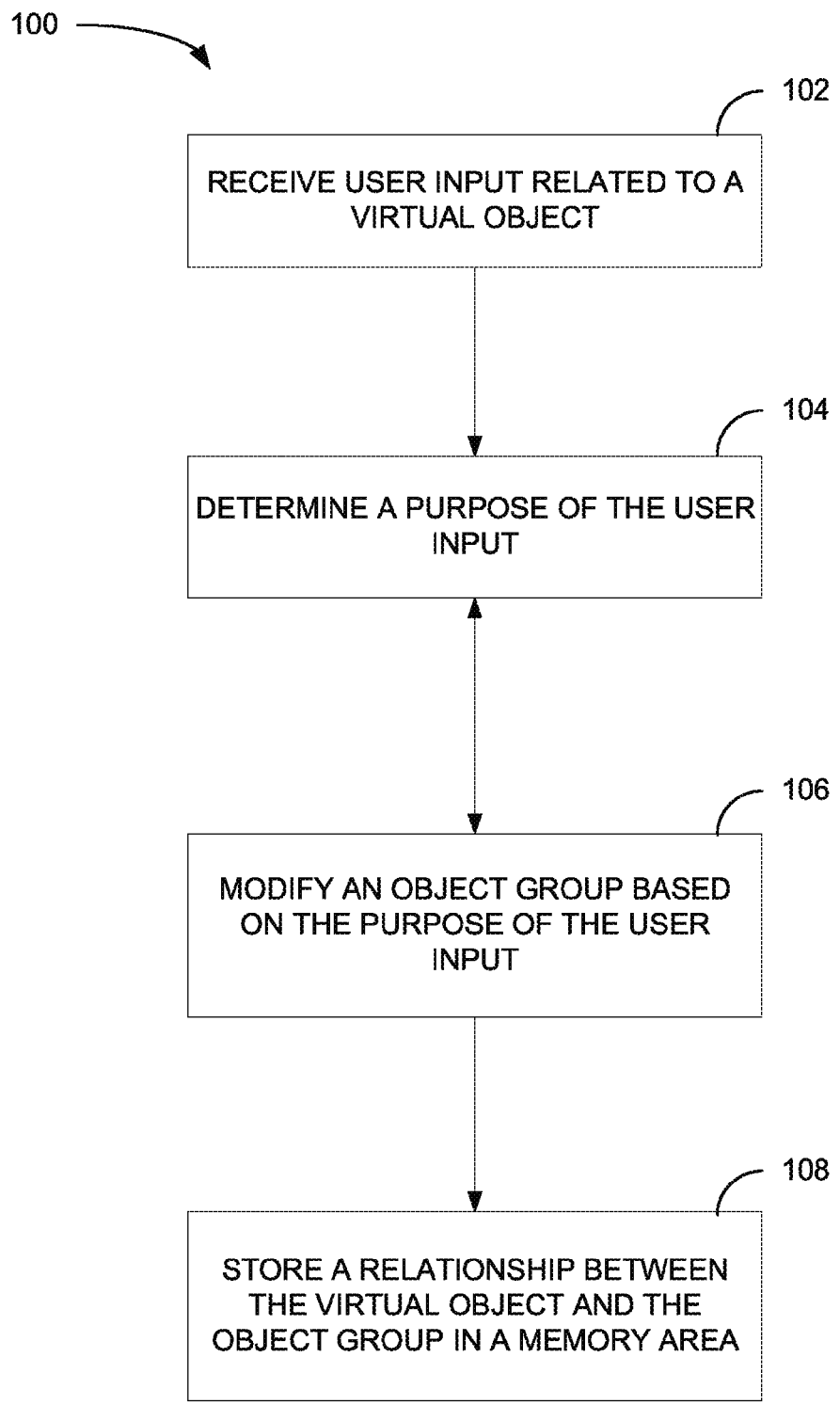
FIG. 1 is a flowchart that illustrates an exemplary computer-implemented method for defining a group of virtual objects.

FIG. 1 is a flowchart 100 that illustrates an exemplary computer-implemented method for defining a group of virtual objects. In an exemplary embodiment, a computer device receives 102 a user input via an input device, wherein the user input is related to one or more virtual objects. As described above, a virtual object is a computer-generated representation of a physical real-world object. The computer device may be a personal computer, such as a laptop or a desktop computer, or may be a tablet computer or a smartphone. Moreover, the input device may be any suitable device for use in receiving user interactions with displayed objects, such as a mouse, a keyboard, or a touch screen. The user input may be any action taken with respect to the virtual object, such as selecting the virtual object, hovering over the virtual object, and/or a drag-and-drop operation in which the virtual object is manually moved into or out of an object group or elsewhere on a display. Touch inputs may be recognized, received, and/or processed using any suitable means known to those skilled in the art.

After receiving the user input, the computer device determines 104 a purpose of the user input. Based on the purpose, the computer device modifies 106 an object group with respect to the virtual object. For example, the virtual object may be added to an object group or removed from an object group based on the user input. Moreover, once the object group is modified 106, the computer device stores 108 the relationship between the virtual object and the object group in a memory area. For example, the virtual object and the object group may both be assigned unique identifiers such that, when a relationship between them is created, modified, or destroyed a link is created in a memory area, such as a database, in order to track which virtual objects are associated to which object groups.

Figure 2:
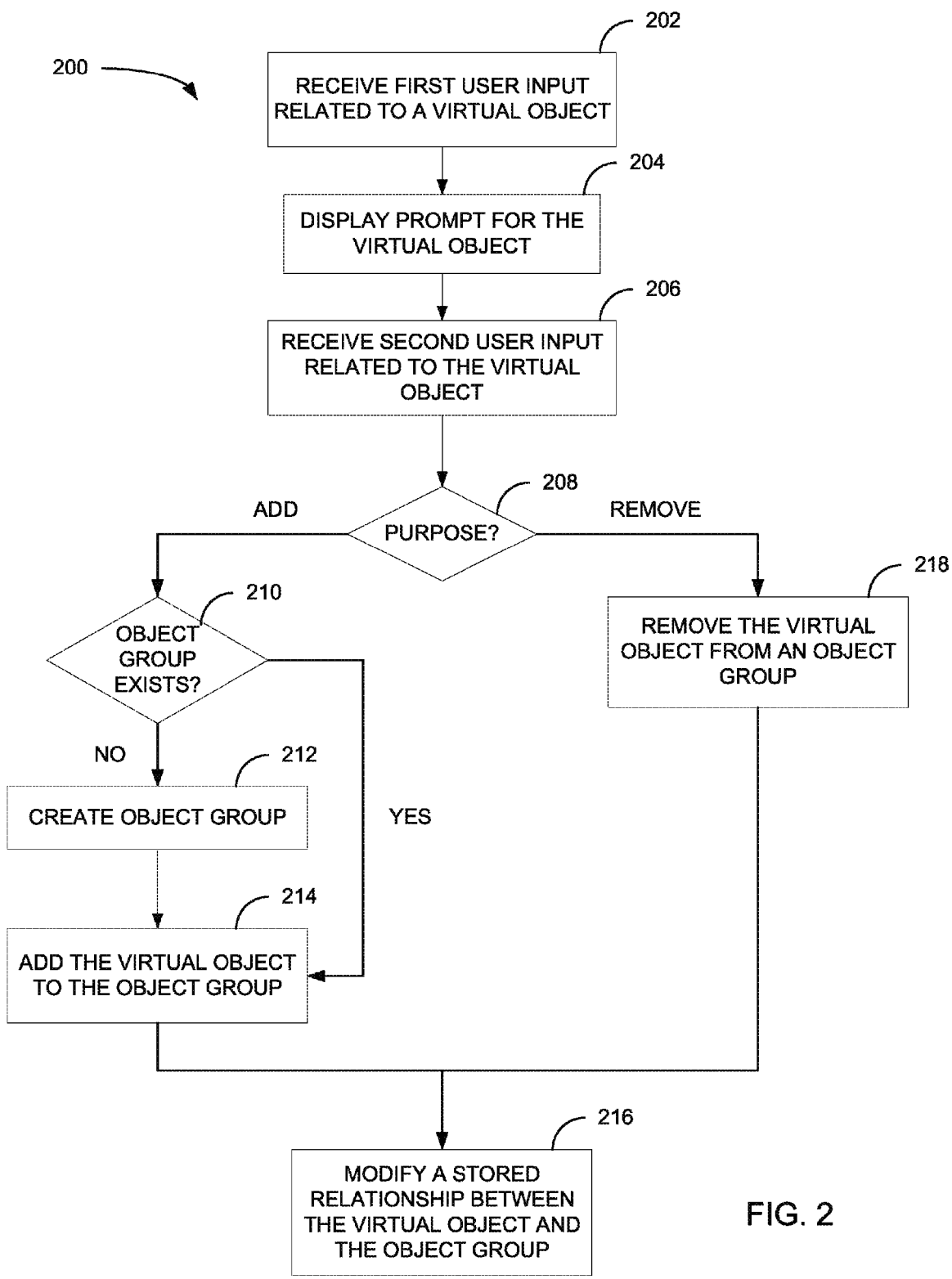
FIG. 2 is a flowchart that illustrates another exemplary computer-implemented method for defining a group of virtual objects.

FIG. 2 is a flowchart 200 that illustrates another embodiment of a computer-implemented method for defining a group of virtual objects. In an exemplary embodiment, a computer device receives 202 a first user input via an input device, wherein the first user input is related to one or more virtual objects. More specifically, the first user input is a first user interaction with one or more virtual objects. In an exemplary embodiment, the first user input is a use of the input device to hover over the virtual object. For a physical input device such as a mouse, the hover action may be placement of a cursor over or near the virtual object, such as within a predefined area surrounding the virtual object. Alternatively, the hover action may be placement of a cursor over or near an on-screen identifier of the virtual object. For a touch screen device, the hover action may be a touch of the virtual object or an on-screen identifier of the virtual object. For example, the touch may be determined to be a hover action when it is longer than a predefined threshold time. Touch inputs may be recognized, received, and/or processed using any suitable means known to those skilled in the art. In response to the first user input, the computer device displays 204 a prompt on or near the virtual object.

FIGS. 3A-3E are diagrams that illustrate the computer-implemented methods shown in FIGS. 1 and 2, as well as in FIGS. 4 and 5 as described below. Specifically, FIGS. 3A-3E show a plurality of virtual objects 300 including a first virtual object 302 through a sixth virtual object 312. As shown in FIGS. 3A-3E, the embodiments described herein can easily be applied to grouping manufacturing machines that are used to automate at least a portion of a manufacturing process. Such advanced planning of manufacturing processes facilitates increased productivity for a manufacturing plant by enabling advanced simulation of the process from beginning to end, and without creating a physical model or mockup or without using actual machines. It should be noted that the embodiments described herein are not limited to grouping representations of manufacturing machines but, rather, can be used to manage groups of representations of any suitable item.

Figure 3A:
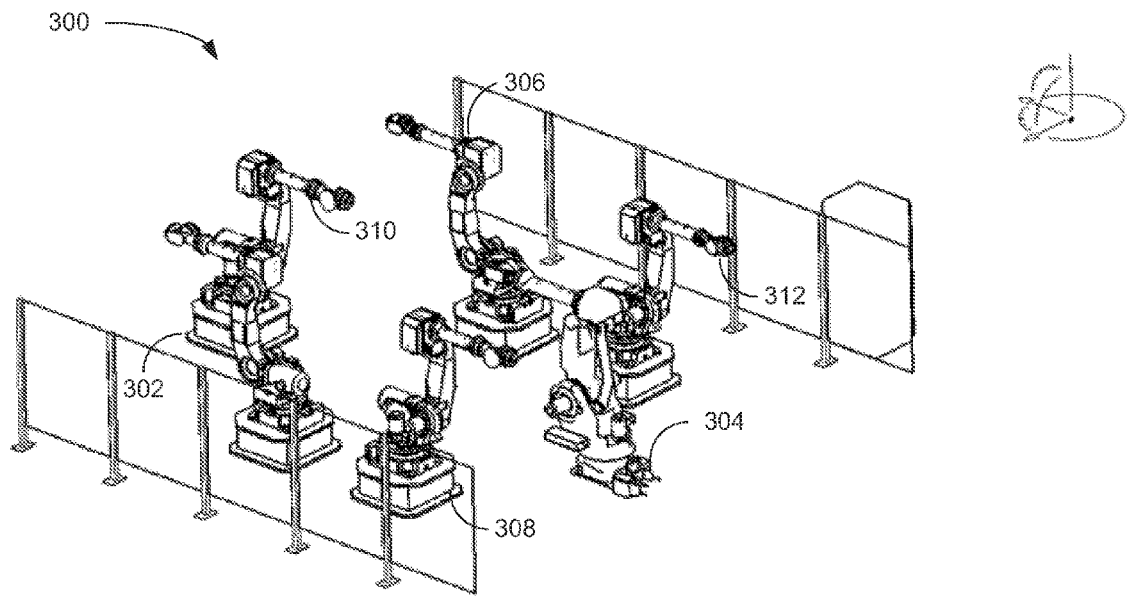
FIGS. 3A-3E are diagrams that illustrate the computer-implemented methods described herein.
Figure 3B:
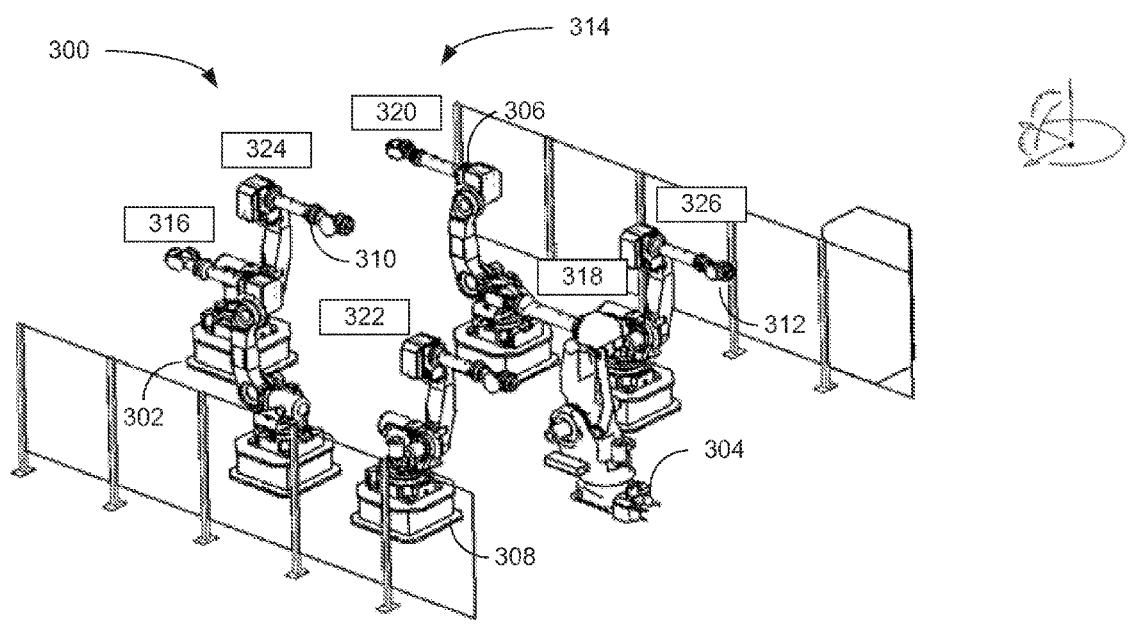
Figure 3C:
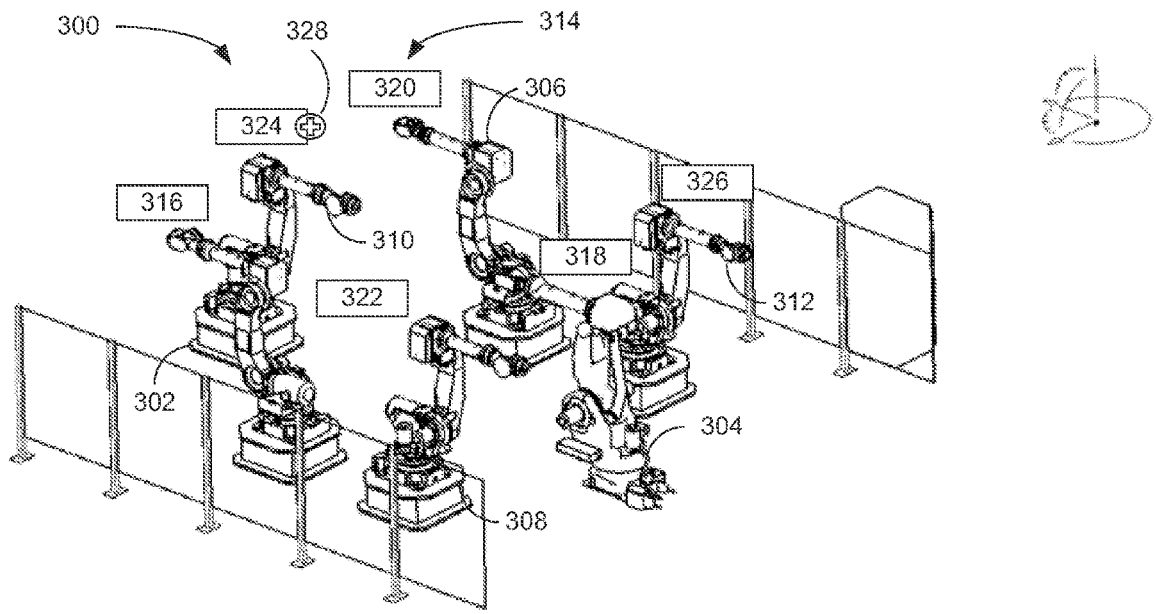

FIG. 3A shows a starting point in which there are no object groups defined and the virtual objects 300 are not identified on the screen. As shown in FIG. 3B, and when the first user input is received 202, the computer device displays a unique identifier 314 for each virtual object 300. For example, the computer device displays a first unique identifier 316 adjacent the first virtual object 302, a second unique identifier 318 adjacent the second virtual object 304, and so on through the sixth unique identifier 326. FIG. 3C shows an example of the prompt 328 that is displayed 204 to a user in response to the first user input. Specifically, the prompt 328 shown in FIG. 3C prompts the user to add fifth virtual object 310 to an object group.

Figure 3D:
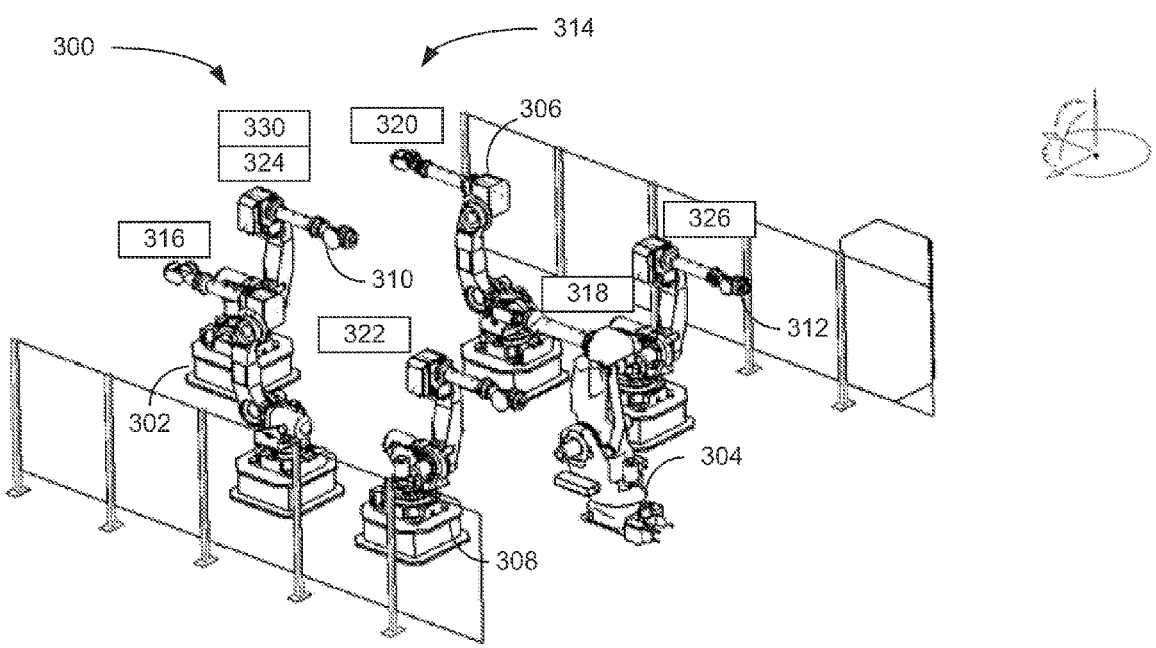

Referring again to FIG. 2, the computer device receives 206 a second user input related to the virtual object. More specifically, the second user input is a second user interaction with one or more virtual objects. In an exemplary embodiment, the second user input is a use of the input device to enter a command with respect to the virtual object to modify an object group. For example, the user may select, such as with click or double-click with a mouse or with a touch, tap, or double-tap with a touch screen device, the prompt 328 shown in FIG. 3C. As noted above, touch inputs may be recognized, received, and/or processed using any suitable means known to those skilled in the art. The computer device determines 208 the purpose of the second user input and modifies an object group accordingly. When the purpose of the second user input is to add a virtual object to an object group, the computer device determines 210 if an object group exists. If an object group does not exist, the computer device creates 212 a new object group and adds 214 the virtual object to the new object group. If an object group does exist, the computer device adds 214 the virtual object to the object group. FIG. 3D shows a newly created object group 330. As described above, the new object group 330 is created by the computer device in order to add the fifth virtual object 310. In an exemplary embodiment, after the virtual object is added 214 to the object group, the computer device modifies 216 a relationship between the virtual object and the object group as stored in a memory area. For example, the virtual object and the object group may both be assigned unique identifiers such that, when a relationship between them is created, modified, or destroyed a link is created in a memory area, such as a database, in order to track which virtual objects are associated to which object groups.

In an exemplary embodiment, and when the purpose of the second user input is to remove a virtual object from an object group, the computer device removes 218 the virtual object and modifies 216 a relationship between the virtual object and the object group as stored in a memory area. FIG. 3C shows the prompt 328 as an addition symbol (+) in order to add the fifth virtual object 310 to an object group. However, if the fifth virtual object 310 were part of an object group, such as object group 330, the prompt 328 is then shown as a subtraction symbol (−) to prompt the user to remove the fifth virtual object 310 from the object group 330.

Figure 3E:
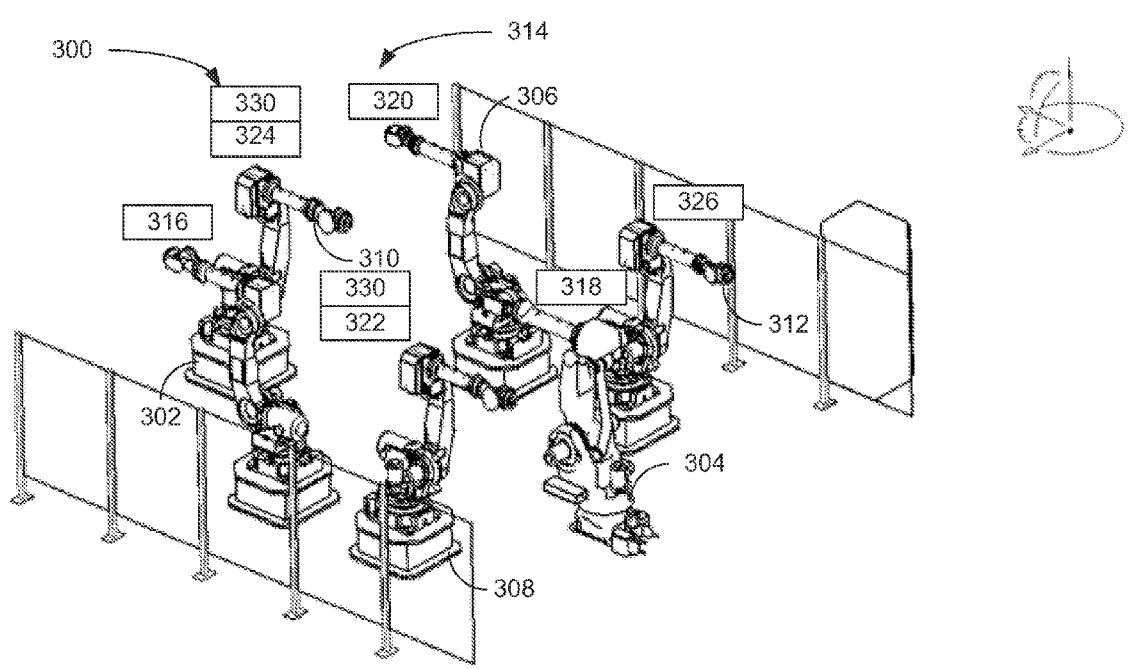

In an exemplary embodiment, the above steps can be repeated to add more virtual objects to an object group. For example, in response to another first user interaction the computer device would display 204 a prompt for a virtual object, such as the fourth virtual object 308. In response to another second user interaction the computer device would add 214 the fourth virtual object 308 to an object group, such as object group 330 as shown in FIG. 3E.

Figure 4:
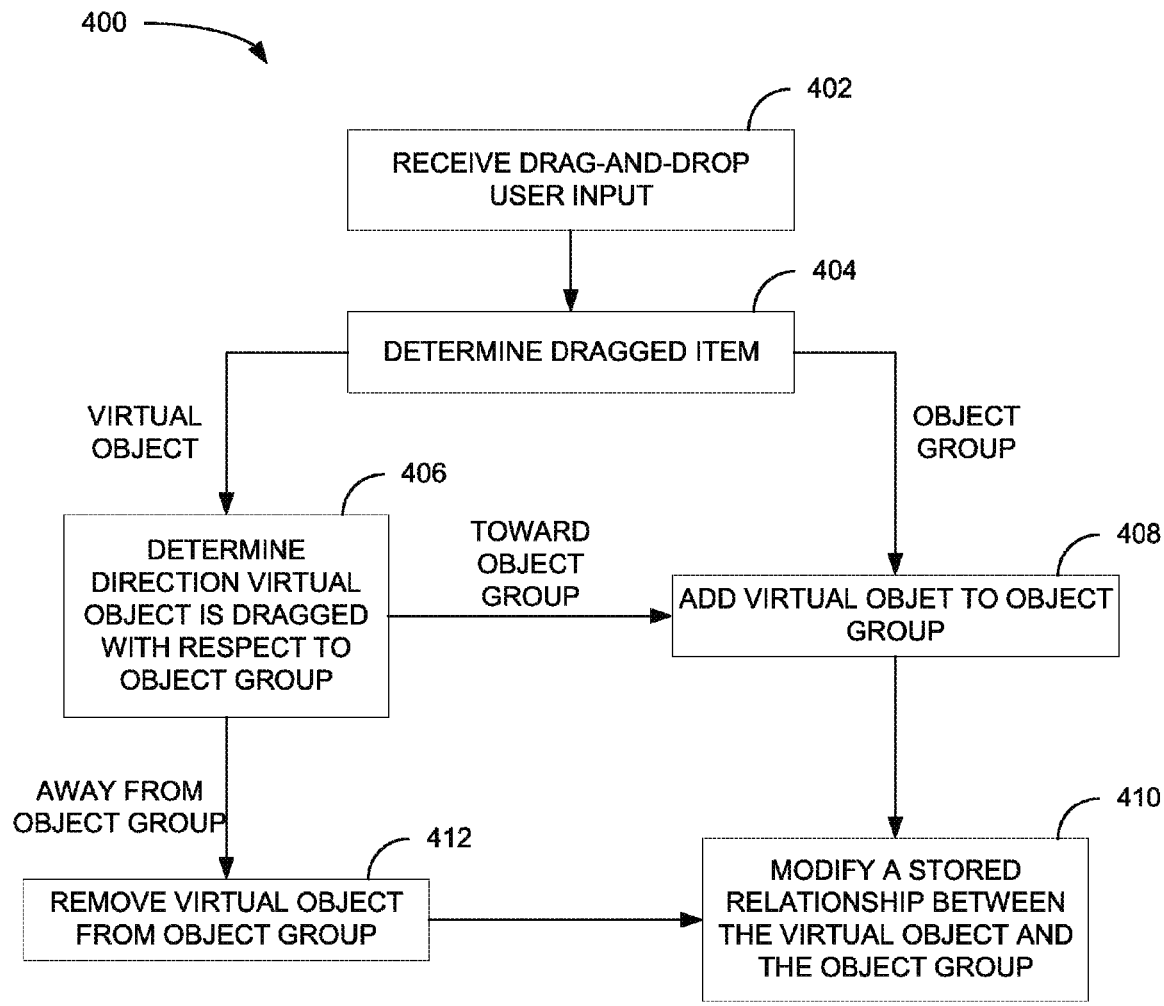
FIG. 4 is a flowchart that illustrates another exemplary computer-implemented method for defining a group of virtual objects.

FIG. 4 is a flowchart 400 of another embodiment of a computer-implemented method for defining a group of virtual objects. In an exemplary embodiment, a computer device receives 402 a drag-and-drop user input. The user input may be received via an input device, such as a mouse or touch pad, or via a touch screen display. Touch inputs may be recognized, received, and/or processed using any suitable means known to those skilled in the art. The computer device then determines 404 the item that was dragged.

When the item is a virtual object or an indicator or identifier related to a virtual object, the computer device determines 406 the direction the virtual object is dragged with respect to an object group. For example, and referring to FIG. 3E, the computer device will determine if an indicator related to the fifth virtual object 310 is dragged out of or away from an indicator related to object group 330, or if an indicator related to the fourth virtual object 308 is dragged towards the indicator related to object group 330. Referring again to FIG. 4, if the indicator is dragged toward an object group, the computer device adds 408 the virtual object to the object group. Moreover, the computer device modifies 410 a relationship between the virtual object and the object group as stored in a memory area. For example, the virtual object and the object group may both be assigned unique identifiers such that, when a relationship between them is created, modified, or destroyed a link is created in a memory area, such as a database, in order to track which virtual objects are associated to which object groups. If the indicator is dragged away from an object group, the computer device removes 412 the virtual object from the object group and modifies 410 a relationship between the virtual object and the object group.

When the item is an object group or an indicator or identifier related to an object group, the computer device adds 408 the virtual object to the object group. Moreover, the computer device modifies 410 a relationship between the virtual object and the object group as stored in a memory area.

Figure 5:
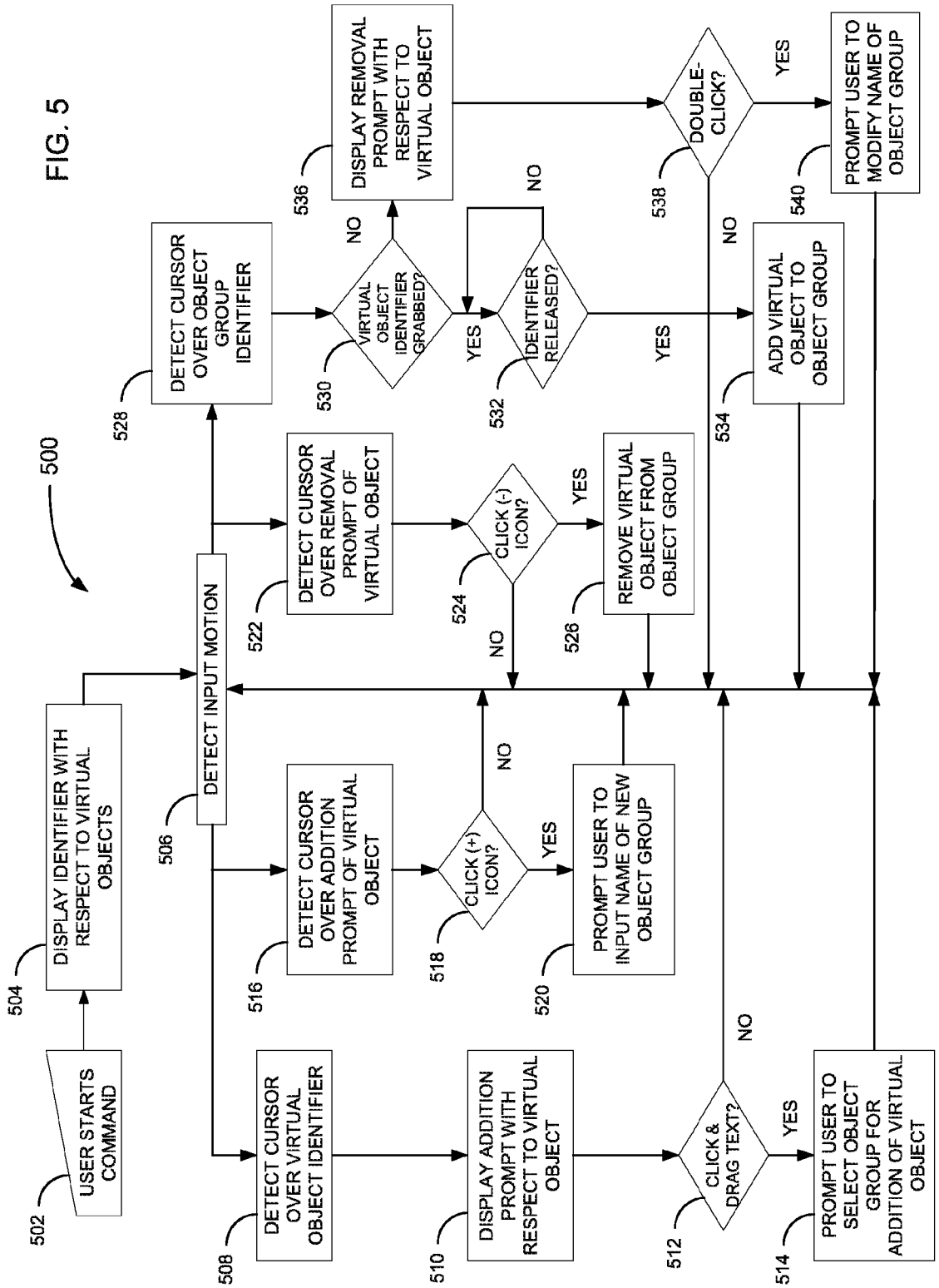
FIG. 5 is a flowchart that illustrates another exemplary computer-implemented method for defining a group of virtual objects.

FIG. 5 is a flowchart 500 that illustrates another embodiment of a computer-implemented method for defining a group of virtual objects. Referring to FIGS. 3A-3E and to FIG. 5, and in an exemplary embodiment, a user starts 502 a command with an input device or via a touch screen display. Touch inputs may be recognized, received, and/or processed using any suitable means known to those skilled in the art. In response, a computer device displays 504 an identifier with respect to a plurality of virtual objects. FIG. 3A shows a plurality of virtual objects 300 prior to the user command and FIG. 3B shows the identifiers 314 of each virtual object 300 displayed by the computer device. The computer device then detects 506 an input motion, such as movement of an input device.

Moreover, the computer device detects 508 when the user places the cursor over or near a virtual object identifier and displays 510 an addition prompt with respect to the virtual object. The placement of the cursor may be determined by the location as input by an input device or by the location of a tap or contact by the user with a touch screen display. As shown in FIG. 3C, when the user positions the cursor over or near fifth identifier 320, for example, a prompt 328 is displayed. This indicates that the virtual object is the currently identified object to manipulate with respect to group membership. The computer device then determines 512 when or if the user drags the virtual object identifier to an existing object group identifier, such as object group 330 (shown in FIG. 3D). If the user does not drag the virtual object identifier, then the computer device waits for the next user input. However, if the user drags the virtual object identifier, then the computer device prompts 514 the user to select an object group into which the virtual object is to be added. For example, FIG. 3D shows an object group 330 that includes only the fifth virtual object 310. When the user drags the identifier of the fourth virtual object 308, the computer device prompts the user to select a destination object group. The user can then drag the identifier of the fourth virtual object 308 to the identifier of object group 330 in order to add the fourth virtual object 308 to object group 330.

Furthermore, the computer device may create a new object group into which a virtual object is to be added. In an exemplary embodiment, the computer device detects 516 when the user places the cursor over or near the addition prompt with respect to the virtual object. The placement of the cursor may be determined by the location as input by an input device or by the location of a tap or contact by the user with a touch screen display. The computer device then detects or determines 518 whether the user clicks the addition prompt. If the user does not click the addition prompt, then the computer device waits for the next user input. However, when the user does click the addition prompt, the computer device prompts 520 the user to enter a name for a new object group and adds the virtual object to the new object group and modifies or creates an association in a memory area between the virtual object and the object group. For example, FIG. 3C shows prompt 328 related to the fifth virtual object 310. If the computer device detects that the user clicks or selects prompt 328, and when there is no pre-existing object group, the computer device prompts the user to enter a new object group name. FIG. 3D shows that, in such a case, the user can enter an object group name such as "Group 1" and that the fifth virtual object 310 is added into the new object group.

The computer device may also remove virtual objects from an object group. In an exemplary embodiment, the computer device detects 522 when the user places the cursor over or near a subtraction prompt with respect to the virtual object. The placement of the cursor may be determined by the location as input by an input device or by the location of a tap or contact by the user with a touch screen display. The computer device then detects or determines 524 whether the user clicks the subtraction prompt. If the user does not click the subtraction prompt, then the computer device waits for the next user input. However, when the user does click the subtraction prompt, the computer device removes 526 the virtual object from its current object group and modifies or deletes an association in a memory area between the virtual object and the object group.

Moreover, the computer device may manage existing object groups. In an exemplary embodiment, the computer device detects 528 when the user places the cursor over or near an object group identifier and determines 530 whether a virtual object identifier is selected or grabbed, such as previously grabbed in a drag-and-drop operation in order to add the virtual object to an object group. If the virtual object identifier has been grabbed, the computer device determines 532 whether the identifier has been released. If the identifier has not been released, the computer device waits. When the identifier is released, the computer device adds 534 the virtual object to the object group and modifies or creates an association in a memory area between the virtual object and the object group. Moreover, when the computer device determines 530 that a virtual object identifier has not been selected or grabbed, the computer device displays 536 a removal prompt with respect to the virtual object. The computer device then determines 538 whether an object group identifier is selected such as via double-click or double-tap. If the identifier has not been selected, the computer device waits for the next user input. However, when the identifier is selected, the computer device prompts 540 the user to enter or modify a new identification, such as a name, of the object group. The computer device then saves the new name in the memory area in association with the virtual object(s) that belong to the object group.

Figure 6:
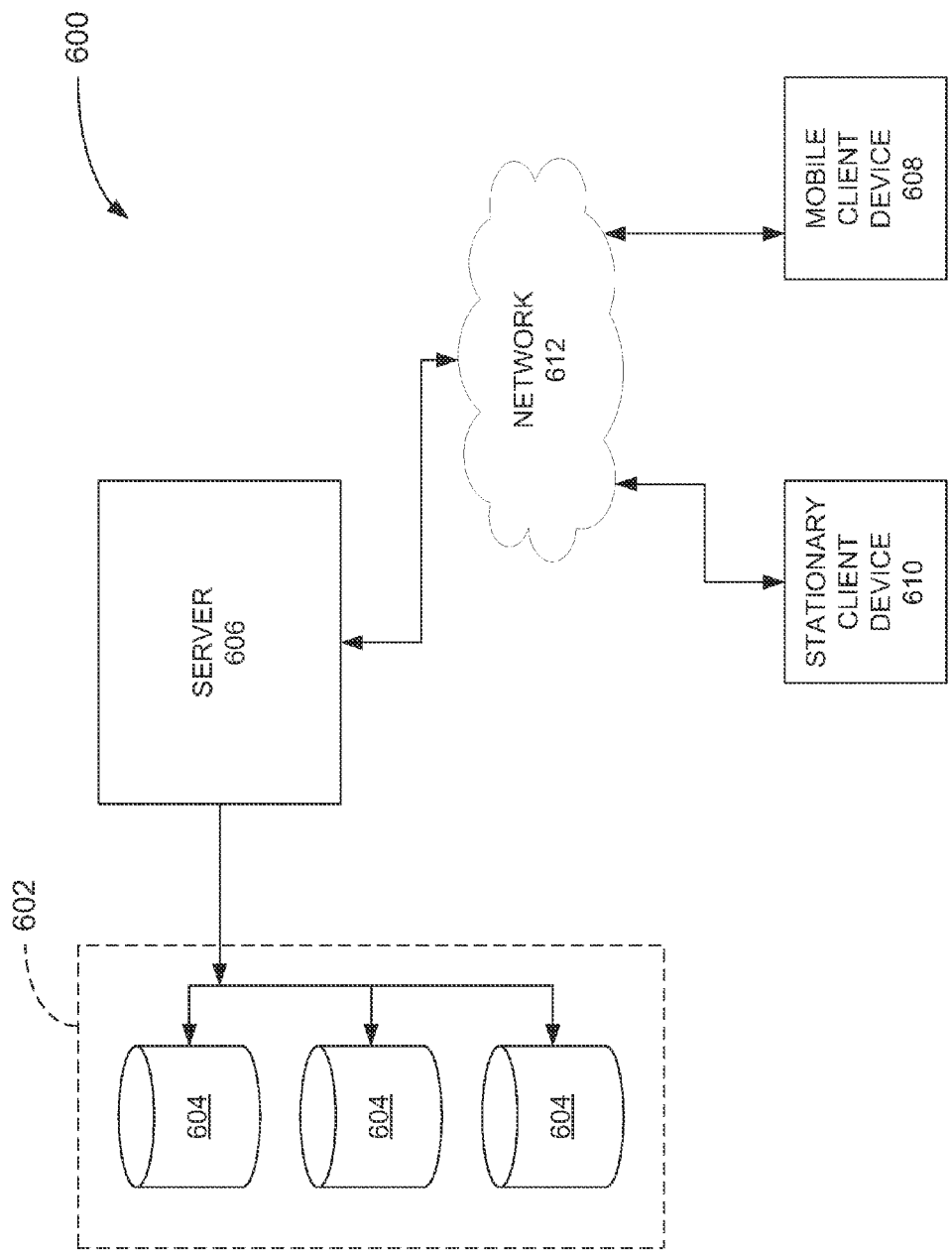
FIG. 6 is a schematic block diagram of an exemplary computer system for use in defining a group of virtual objects.

FIG. 6 is a schematic block diagram of an exemplary computer system 600 for use in defining a group of virtual objects, and/or for use in performing the processes described above and/or additional processes that may be related to those described above. In an exemplary embodiment, a memory area 602 includes one or more storage devices 604 for use in storing data, such as properties of physical objects, such as manufacturing machines; properties of virtual objects that are used to represent such physical objects; properties of processes in which the physical objects can be used and the associated virtual objects can be used to model; and group membership lists and/or associations that link object groups and virtual objects. The storage devices 604 may be embodied as one or more databases, may be located at a single or at multiple geographical sites, or may be integrated with the server system 606. In some embodiments, the memory area 602 is coupled to a server system 606, which is in turn coupled to client devices such as one or more mobile client devices 608 and/or one or more stationary client devices 610, via a network 612. Mobile client devices 608 may be any mobile device including, but not limited to only including, laptop computers, tablet computers, and/or smartphones. Stationary client devices 610 may be any device that is generally not mobile, such as desktop computers and the like.

As can be appreciated, the network 612 can be a public network, such as the Internet, or a private network such as an LAN or WAN network, or any combination thereof and can also include PSTN or ISDN sub-networks. The network 612 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 612 is merely exemplary and in no way limits the scope of the present advancements.

The client devices 608 and 610 can be any suitable computer architecture such as the one described below with reference to FIG. 7, or any other computing architecture that is known. Moreover, it should be understood that the server system 606 is configured to perform the processes described above and/or any additional processes that may be related to those described above.

The server system 606 stores the computer-readable instructions to execute the processes described above, and provides these instructions via the network 612 to the client devices 608 and 610. Moreover, the server system 606 can also provide data from the memory area 602 as needed to the client devices 608 and 610 such that the client devices 608 and 610 execute the processes described above. As such, FIG. 6 includes implementations of the computer system 600 via cloud computing, distributed computing, and the like.

Figure 7:
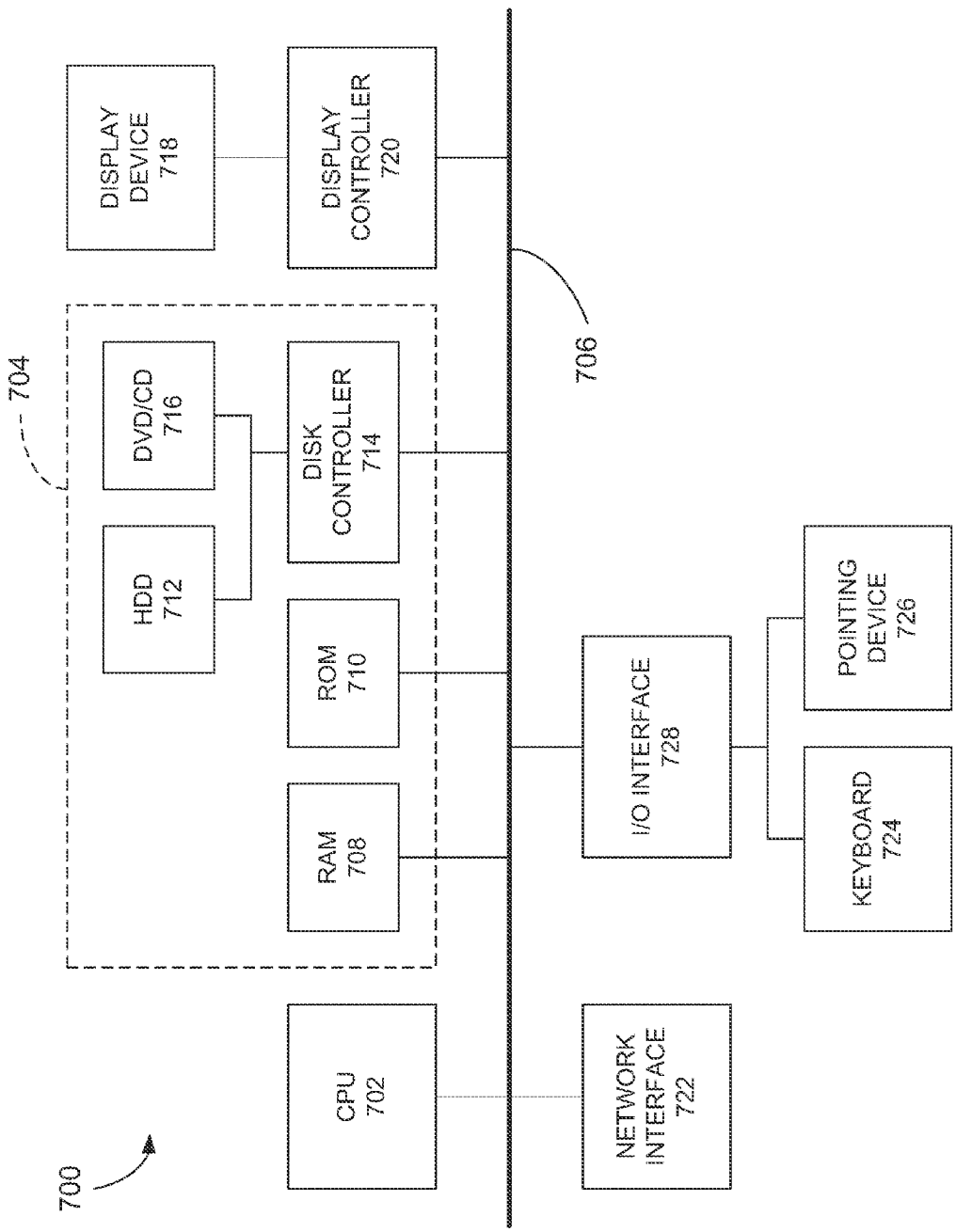
FIG. 7 is a schematic block diagram of an exemplary computer architecture for use in defining a group of virtual objects.

FIG. 7 is a schematic block diagram of an exemplary computer architecture 700 for use with the server system 606 and/or the client devices 608 and 610 (each shown in FIG. 6).

In an exemplary embodiment, the computer architecture 700 includes one or more processors 702 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 704 that is operably and/or communicatively coupled to the processor 702 by a system bus 706. A "memory area," as used herein, refers generally to any means of storing non-transitory program code and instructions executable by one or more processors to aid in defining a group of virtual objects, and/or for use in performing the processes described above and/or additional processes that may be related to those described above. The memory area 704 may include one, or more than one, forms of memory. For example, the memory area 704 may include random-access memory (RAM) 708, which can include non-volatile RAM, magnetic RAM, ferroelectric RAM, and/or other forms of RAM. The memory area 704 may also include read-only memory (ROM) 710 and/or flash memory and/or electrically-programmable read-only memory (EEPROM). Any other suitable magnetic, optical, and/or semiconductor memory, such as a hard-disk drive (HDD) 712, by itself or in combination with other forms of memory, may be included in the memory area 704. The HDD 712 may also be coupled to a disk controller 714 for use in transmitting and receiving messages to and from the processor 702. Moreover, the memory area 704 may also be, or may include, a detachable or removable memory 716, such as a suitable cartridge disk, CD-ROM, DVD, or USB memory. The above examples are exemplary only and, thus, are not intended to limit in any way the definition and/or meaning of the term "memory area."

The computer architecture 700 also includes a display device 718 that is coupled, such as operatively coupled, to a display controller 720. The display controller 720 receives data via the system bus 706 for display by the display device 718. The display device 718 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 718 may include a touchscreen with an associated touchscreen controller. The above examples are exemplary only and, thus, are not intended to limit in any way the definition and/or meaning of the term "display device."

In addition, the computer architecture 700 includes a network interface 722 for use in communicating with a network (not shown in FIG. 7). Moreover, the computer architecture 700 includes one or more input devices, such as a keyboard 724 and/or a pointing device 726, such as a roller ball, mouse, touchpad, and the like. The input devices are coupled to and controlled by an input/output (I/O) interface 728, which is further coupled to the system bus 706.

A description of the general features and functionality of the display device 718, keyboard 724, pointing device 726, as well as the display controller 720, disk controller 714, network interface 722, and I/O interface 728 is omitted herein for brevity as these features are known.

Exemplary embodiments of computer systems, computer-implemented methods, and computer devices for use in defining and/or managing groups of virtual objects are described above in detail. The computer systems, computer-implemented methods, and computer devices are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer device, such as those described herein, includes at least one processor or processing unit and a system memory. The computer device typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary computer system environment, embodiments of the invention are operational with numerous other general purpose or special purpose computer system environments or configurations. The computer system environment described herein is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computer-implemented method for defining a group of virtual objects representative of physical real-world objects, said computer-implemented method comprising:
receiving a user input via an input device, the received user input related to at least one virtual object representative of at least one physical real-world object, wherein each of the at least one virtual object is displayed in a screen view as a graphical, multi-dimensional model of the respective at least one physical real-world object, and for each virtual object: (a) the received user input is with respect to a respective unique virtual object identifier corresponding to the virtual object, and (b) the respective unique virtual object identifier is indicated in the screen view near the virtual object;
using a processor to determine a purpose of the user input;
modifying a virtual object group in order to simulate group planning of physical real-world objects for manufacturing processes, the virtual object group being modified with respect to the at least one virtual object based on the determined purpose of the user input;
in the screen view, indicating the modified virtual object group by: displaying in the screen view a unique virtual object group identifier corresponding to the virtual object group, and displaying the unique virtual object group identifier indicated in the screen view near each of the at least one virtual object; and
storing in a memory area, an indication of relationship between the modified virtual object group and the at least one virtual object, wherein the respective unique virtual object identifier and the unique virtual object group identifier are linked in the memory area representing the relationship and enabling tracking of the relationship.

2. A computer-implemented method in accordance with claim 1, wherein receiving the user input comprises receiving a first user input representative of a first interaction with the at least one virtual object, and wherein said computer-implemented method further comprises displaying a prompt to the user via a display device to modify the virtual object group with respect to the at least one virtual object.

3. A computer-implemented method in accordance with claim 2, wherein receiving the user input further comprises receiving a second user input representative of a second interaction with the at least one virtual object, and wherein modifying the virtual object group comprises adding the at least one virtual object to the virtual object group and modifying the stored indication of relationship between the modified virtual object group and the at least one virtual object in the memory area.

4. A computer-implemented method in accordance with claim 3, wherein modifying the virtual object group further comprises creating the virtual object group into which the at least one virtual object is added.

5. A computer-implemented method in accordance with claim 2, wherein receiving the user input further comprises receiving a second user input representative of a second interaction with the at least one virtual object, and wherein modifying the virtual object group comprises removing the at least one virtual object from the virtual object group and modifying the stored indication of relationship between the modified virtual object group and the at least one virtual object in the memory area.

6. A computer-implemented method in accordance with claim 1, wherein the user input is a drag-and-drop operation in which the at least one virtual object is dragged toward an indicator of the virtual object group, and wherein modifying the virtual object group comprises adding the at least one virtual object to the virtual object group.

7. A computer-implemented method in accordance with claim 1, wherein the user input is a drag-and-drop operation in which an indicator of the virtual object group is dragged toward the at least one virtual object, and wherein modifying the virtual object group comprises adding the at least one virtual object to the virtual object group.

8. A computer device for use in defining a group of virtual objects representative of physical real-world objects, said computer comprising:
an input device;
a memory area; and
a processor coupled to said input device and said memory area, said processor configured to:
receive a user input via said input device, the received user input related to at least one virtual object representative of at least one physical real-world object, wherein each of the at least one virtual object is displayed in a screen view as a graphical, multi-dimensional model of the respective at least one physical real-world object, and for each virtual object: (a) the received user input is with respect to a respective unique virtual object identifier corresponding to the virtual object, and (b) the respective unique virtual object identifier is indicated in the screen view near the virtual object;
determine a purpose of the user input;
modify virtual object group in order to simulate group planning of physical real-world objects for manufacturing processes, the virtual object group being modified with respect to the at least one virtual object based on the determined purpose of the user input;
in the screen view, indicating the modified virtual object group by: displaying in the screen view a unique virtual object group identifier corresponding to the virtual object group, and displaying the unique virtual object group identifier indicated in the screen view near each of the at least one virtual object; and
store in said memory area an indication of relationship between the modified virtual group and the at least one virtual object, wherein the respective unique virtual object identifier and the unique virtual object group identifier are linked in the memory area representing the relationship and enabling tracking of the relationship.

9. A computer in accordance with claim 8, wherein the user input includes a first user input representative of a first interaction with the at least one virtual object, and wherein said processor is further configured to cause a display device to display a prompt to the user to modify the virtual object group with respect to the at least one virtual object.

10. A computer in accordance with claim 9, wherein the user input further includes a second user input representative of a second interaction with the at least one virtual object, and wherein said processor is configured to add the at least one virtual object to the virtual object group and to modify the stored indication of relationship between the modified virtual object group and the at least one virtual object in said memory area.

11. A computer in accordance with claim 10, wherein said processor is further configured to create the virtual object group into which the at least one virtual object is added.

12. A computer in accordance with claim 9, wherein the user input further includes a second user input representative of a second interaction with the at least one virtual object, and wherein said processor is configured to remove the at least one virtual object from the virtual object group and to modify the stored indication of relationship between the modified virtual object group and the at least one virtual object in said memory area.

13. A computer in accordance with claim 8, wherein the user input is a drag-and-drop operation in which the at least one virtual object is dragged toward an indicator of the virtual object group, and wherein said processor is configured to add the at least one virtual object to the virtual object group.

14. A computer in accordance with claim 8, wherein the user input is a drag-and-drop operation in which an indicator of the virtual object group is dragged toward the at least one virtual object, and wherein said processor is configured to add the at least one virtual object to the virtual object group.

15. A computer system for use in defining a group of virtual objects representative of physical real-world objects, said computer system comprising:
a client device configured to receive a user input related to at least one virtual object representative of at least one physical real-world object, wherein each of the at least one virtual object is displayed in a screen view as a graphical, multi-dimensional model of the respective at least one physical real-world object, and for each virtual object: (a) the received user input is with respect to a respective unique virtual object identifier corresponding to the virtual object, and (b) the respective unique virtual object identifier is indicated in the screen view near the virtual object; and
a server system coupled to said client device, said server system configured to:
determine a purpose of the user input;
modify virtual object group in order to simulate group planning of physical real-world objects for manufacturing processes, the virtual object group being modified with respect to the at least one virtual object based on the determined purpose of the user input;
in the screen view, indicate the modified virtual object group by: displaying in the screen view a unique virtual object group identifier corresponding to the virtual object group, and displaying the unique virtual object group identifier indicated in the screen view near each of the at least one virtual object; and
store in a memory area an indication of relationship between the modified virtual object group and the at least one virtual object, wherein the respective unique virtual object identifier and the unique virtual object group identifier are linked in the memory area representing the relationship and enabling tracking of the relationship.

16. A computer system in accordance with claim 15, wherein the user input includes a first user input representative of a first interaction with the at least one virtual object, and wherein said server system is further configured to transmit a signal to said client device representative of a prompt to the user to modify the virtual object group with respect to the at least one virtual object.

17. A computer system in accordance with claim 16, wherein the user input further includes a second user input representative of a second interaction with the at least one virtual object, and wherein said server system is configured to add the at least one virtual object to the virtual object group and to modify the stored indication of relationship between the modified virtual object group and the at least one virtual object in the memory area.

18. A computer system in accordance with claim 17, wherein said server system is further configured to create the virtual object group into which the at least one virtual object is added.

19. A computer system in accordance with claim 16, wherein the user input further includes a second user input representative of a second interaction with the at least one virtual object, and wherein said server system is configured to remove the at least one virtual object from the virtual object group and to modify the stored indication of relationship between the modified virtual object group and the at least one virtual object in the memory area.

20. A computer system in accordance with claim 15, wherein the user input is one of a first drag-and-drop operation in which the at least one virtual object is dragged toward an indicator of the virtual object group and a second drag-and-drop operation in which the indicator of the virtual object group is dragged toward the at least one virtual object, and wherein said server system is configured to add the at least one virtual object to the virtual object group.

* * * * *